March 12, 1946.　　　C. M. HINES　　　2,396,423
AIR RAID WARNING CONTROL SYSTEM
Filed June 26, 1942　　　2 Sheets-Sheet 1
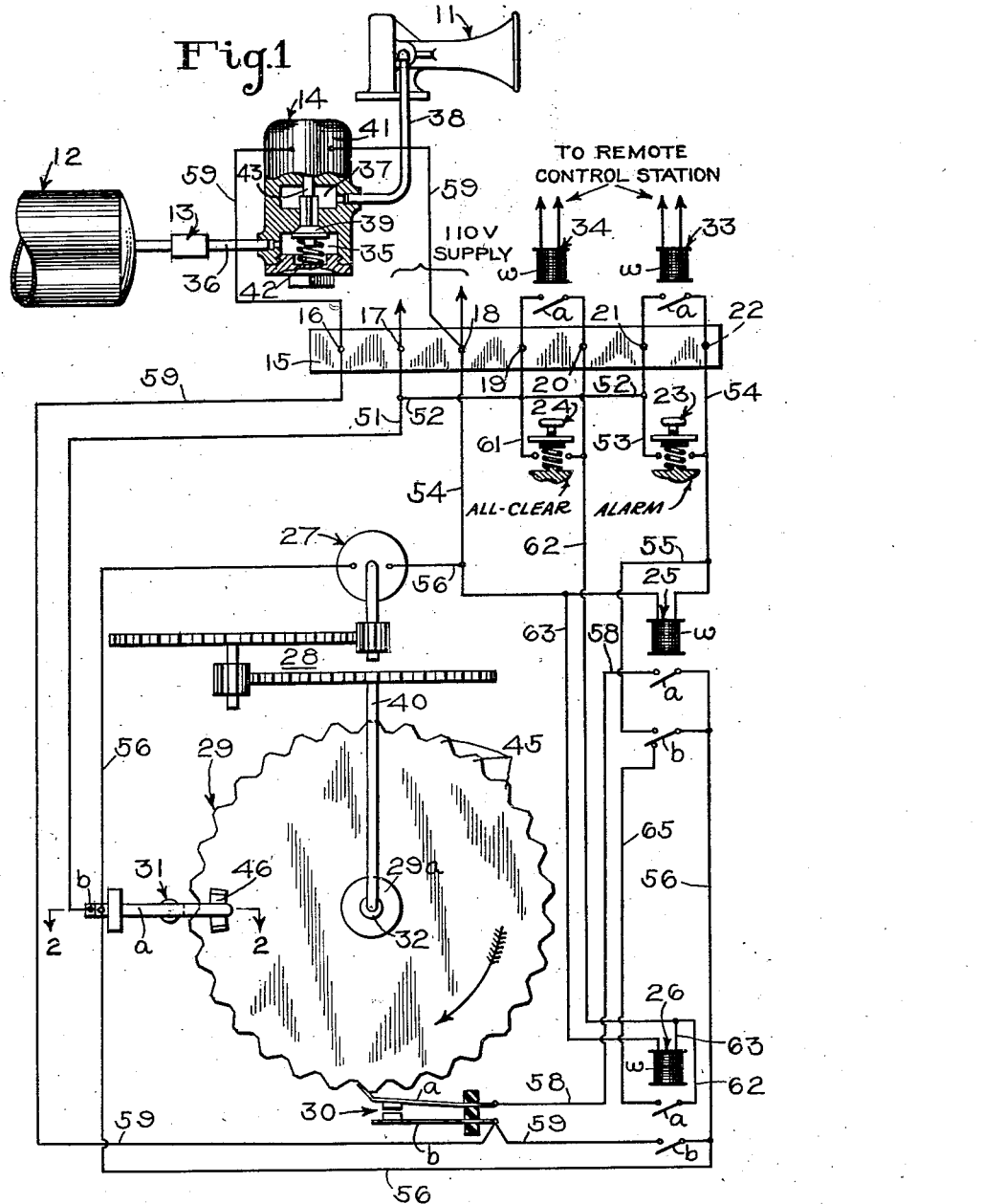
INVENTOR
ClaudeM.Hines
BY
ATTORNEY

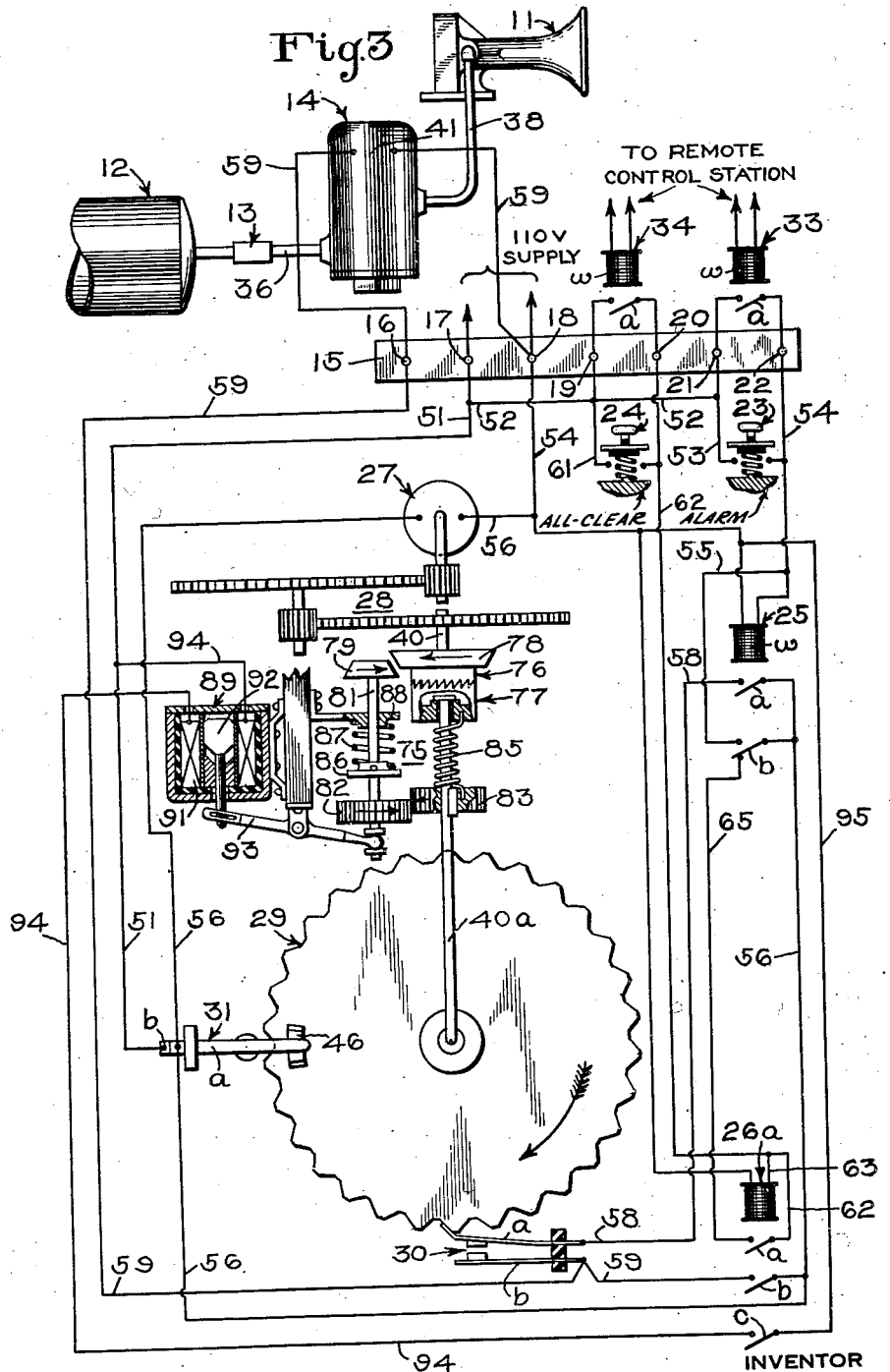

Patented Mar. 12, 1946

2,396,423

UNITED STATES PATENT OFFICE 2,396,423

AIR RAID WARNING CONTROL SYSTEM

Claude M. Hines, Pittsburgh, Pa., assignor to The Westinghouse Air Brake Company, Wilmerding, Pa., a corporation of Pennsylvania Application June 26, 1942, Serial No. 448,594

10 Claims. (Cl. 177—8)

This invention relates to air raid warning control systems and has particular relation to control systems for automatically providing coded "alarm" and "all-clear" signals in cycles of predetermined duration in response to a momentary initiatory impulse either by a local operator or by a remotely stationed operator.

In the prior joint application, Serial No. 441,196, of Robert A. Mitchell and the present applicant, now Patent No. 2,381,224, granted August 7, 1945, as well as the prior sole application, Serial No. 441,197 of the present applicant, both of which applications were filed on April 30, 1942 and are assigned to the assignee of the present application, there are disclosed various types of control systems for providing automatically coded "alarm" and "all-clear" signals in cycles of predetermined duration initiated in response to a momentary initiatory impulse effected by either a local or a remotely stationed operator.

It will be understood that the so-called "alarm" signal indicates an approaching or imminent air raid and that the "all-clear" signal indicates the ending of an air raid. In the two prior applications above mentioned, the "alarm" signal is a succession of short audible signals effected over a period of time, referred to herein as the "cycle-time," such as two minutes. The "all-clear" signal is a continuous audible signal having the same cycle-time as the "alarm" signal.

All of the various control systems disclosed in the above mentioned prior applications require vigilance on the part of the operator to insure the full duration of the first cycle of signal operation following the resumption of the power supply after a failure of the power supply. In other words, the failure of the electrical power supply for any reason, during a signal cycle, limits the cycle-time of the first signal after the resumption of power to a time which is equal to the portion of time remaining of the previous cycle of signal operation during which the interruption of the power supply occurs. In order to insure the full cycle-time of a signal, therefore, it is necessary in the case of the apparatus disclosed in the above mentioned applications for the operator to wait to see if the signal is of full duration and, if not, then initiate a second operation of the signal following the first. It is desirable to insure the full duration of the signal cycle so that the signal may serve its full warning purpose.

It is an object of my present invention, therefore, to provide a control system for an air raid warning signal device which obviates attention on the part of the operator and which insures the required duration of a signal cycle at all times, notwithstanding the failure of power during a previous signal cycle.

As previously indicated, the duration of the cycle time of "alarm" and "all-clear" signals in the control systems disclosed in the above-mentioned prior applications is the same, for example, two minutes. In the case of the "all-clear" signal, this requires a relatively large quantity of air under pressure to operate the signal device in cases where air operated horns or signal devices are employed, because of the continuous consumption of air under pressure during the "all-clear" signal. In order, therefore, to conserve the supply of air under pressure without materially sacrificing the attention arresting power of the "all-clear" signal, it has been proposed to provide an "all-clear" signal having a cycle-time which is less than that of the "alarm" signal.

It is accordingly a further object of my present invention to provide a control system for an air raid warning signal device in which the cycle-time of the "all-clear" signal is automatically less than that of the "alarm" signal.

More specifically, it is a further object of my persent invention to provide a control system of the type indicated in the foregoing object and characterized by timing apparatus which automatically and selectively operates to limit the cycle-time of "alarm" and "all-clear" signals to different lengths of time, respectively.

The above objects, and other objects of my invention which will be made apparent hereinafter, are attained in several embodiments of my invention subsequently to be described and shown in the accompanying drawings, wherein:

Fig. 1 is a diagrammatic view showing one embodiment of my invention,

Fig. 2 is a fragmental view, taken on the line 2—2 of Fig. 1, showing further details of the corresponding switch device in Fig. 1, and Fig. 3 is a diagrammatic view, showing a second embodiment of my invention in which the duration of the operating cycle for the "all-clear" signal is different from that of the "alarm" signal.

Description of Figure 1

The apparatus shown in Fig. 1 comprises a signal device in the form of an air-operated horn 11; a suitable source of air under pressure in the form of a reservoir 12 that is charged to a predetermined pressure, such as one-hundred twenty pounds per square inch, by a suitable compressor not shown; a reducing valve device 13 of any suitable construction for reducing the pressure of the air supplied from the reservoir 12 to a pressure at which the horn 11 may be most efficiently operated, such as eighty pounds per square inch; and a magnet valve device 14 for controlling the supply of air under pressure from the reducing valve device 13 to the horn 11.

By means of control apparatus presently to be described, the magnet valve device 14 is controlled automatically in a manner to produce a coded operation of the horn to sound an "alarm" or an "all-clear" signal. The control apparatus for the magnet valve 14 may be contained in a unitary casing of sheet metal, Bakelite, micarta, hard rubber, or other suitable material having a terminal board or strap 15 secured therein, in which a plurality of terminal posts 16, 17, 18, 19, 20, 21, and 22 are secured in aligned spaced relation. The posts may be provided with wire-securing nuts, if desired, or adapted to have wires soldered thereto.

The control apparatus contained in the casing comprises two push-button switches 23 and 24, so mounted in the wall of the casing unit as to be operable from the exterior of the casing, and respectively designated the "alarm" switch and the "all-clear" switch; two relays 25 and 26 hereinafter respectively designated the alarm relay and the all-clear relay; and a signal coding and timing device comprising a suitable electric motor 27, a speed reduction gear mechanism 28, a cam disk 29 driven by the motor 27 through the speed reduction gear mechanism 28, a coding switch 30 and a timing switch 31 associated with the cam disk 29 in the manner presently to be described.

In addition, the control apparatus may include two so-called "remote-control" relays 33 and 34, arranged to be controlled from a remote control station, such as a central control bureau or a telephone exchange.

Considering the parts of the equipment in greater detail, the horn 11 is of the type described in Patent No. 2,263,342, to Norman F. Lewis in which the vibration of a sound-producing diaphragm is effected in response to the supply of air under pressure to the horn. The particular construction of the horn 11 is, however, not material to my invention inasmuch as any horn device operated in response to the supply of air under pressure thereto may be employed.

It is preferable, however, to employ an air-operated horn which is not directionally selective. If directionally selective horns are employed, then a plurality of horns radiating in different directions of the compass should be connected in multiple to a common air supply pipe.

My invention is not limited in its use to air operated signal devices, however, but may be employed in connection with any type of signal device controllable by an electro-responsive or a magnet valve device.

The magnet valve device 14 may be of any standard type. As diagrammatically shown, it may comprise a suitable casing having a chamber 35 to which the supply pipe 36 from the reservoir 12 having the pressure reducing valve device 13 interposed therein is constantly connected; a chamber 37 to which the horn 11 is constantly connected by a pipe 38; a valve 39 of the poppet type controlling communication between the chambers 35 and 37; and a magnet winding 41 for operating the valve 39.

The valve 39 is urged upwardly to a seated position, closing communication between the chambers 35 and 37, by a coil spring 42 and unseated downwardly in response to energization of the magnet winding 41 by means of a suitable plunger 43 actuated by the magnet winding.

It will thus be seen that when the magnet winding 41 is deenergized, the supply of air to the horn 11 is cut-off and the horn is silent. It will also be seen that whenever and as long as the magnet winding 41 is energized, air under pressure is supplied to the horn 11 to cause it to produce an audible signal or blast.

The push-button switches 23 and 24 may be of any suitable type which are biased to an open position normally and which are closed only in response to the continued application of manual pressure by the operator.

The relays 25 and 26 may be of any standard type suited to the type of electric current, that is alternating or direct current, and the voltage employed. As shown, the relay 25 has a suitable winding $w$, a front contact $a$, and a transfer contact $b$. The relay 26 has a winding $w$ and two front contacts $a$ and $b$.

The term "front contact" identifies a switch contact which is in open position when the armature of the relay is dropped-out and which is actuated to a closed position when the armature of the relay is picked-up. The term "transfer contact" refers to a switch contact which is in one closed position when the armature of the relay is dropped-out and which is actuated to a different closed position when the armature of the relay is actuated to its picked-up position.

The relays 33 and 34 are simple standard relays each of which has a suitable winding $w$, controllable from a remote control station (not shown) and a single front contact $a$.

The motor 27 of the signal coding and timing apparatus may be of any suitable type adapted to operate at, or nearly at, a constant speed. Thus motor 27 may be similar to the synchronous motors employed in electric clocks, wherein the power requirements are small, the motor being self-starting upon the application of voltage thereto. The advantage of the synchronous motor is that it is not affected by variations in the voltage of the voltage supply and maintains a constant speed with a constant frequency of the power supply.

If the apparatus is to be employed optionally in connection with either an A. C. or D. C. source of supply, a universal type of motor will be required.

The speed reduction gear mechanism 28 is of any suitable design so as to provide the necessary ratio between the speed of rotation of the cam disk 29 and that of the motor 27.

As will appear hereinafter, it is desired to cause rotation of the cam disk 29 at such a speed that it rotates through one full revolution in two minutes. It is accordingly necessary to design the speed reducing gear mechanism 28 in such a manner as to produce the desired ratio between the speed of the motor and the speed at which the cam disk 29 is to be driven.

The cam disk 29 is made of a suitable insulating material such as Bakelite, micarta, or hard rubber and has a central boss or hub portion $29a$ in which a suitable metal bushing 32 is embedded for fixedly securing the cam disk in perpendicular relation to the output shaft 40 of the speed reducing gear mechanism 28.

The cam disk 29 has a plurality of cam teeth 45 cut or formed on the periphery thereof. The coding switch 30 which is of the telephone type, having two flexible contact fingers $a$ and $b$, is associated with the cam disk 29 in such a manner as to have the outer end of contact finger a ride on the cam teeth 45 and bent into engagement with or disengaged from the other contact finger as the cam disk rotates. The switch 30 is closed as long as contact finger a rides on the high point of the cam teeth and is open when it rides on the low point of the teeth.

The number and spacing of the cam teeth 45 may be selected as desired. As shown, the cam teeth are uniform in contour and spaced regular uniform angular distances apart in such a manner that the switch 30 is alternately closed and opened the same length of time, assuming rotation of the cam disk 29 at constant speed. Moreover, as shown, the number of the teeth 45 is such as to cause the switch 30 to be opened or closed a desired number of times during each revolution of the cam disk. As shown, therefore, the cam disk 29 has thirty teeth and the contour of the cams is such as to cause the switch 30 to be alternately closed and opened respectively for a period of two seconds, assuming rotation of the cam disk 29 at such a speed as to complete one full revolution in two minutes.

Obviously, however, the number, spacing, and contour of the teeth 45 may be selected and arranged as desired to cause any desired sequence of operation of the switch 30.

On one face of the cam disk 29 adjacent the periphery thereof is a laterally projecting cam element 46. The timing switch 31, like the switch 30, is of the telephone type having two flexible insulated contact members a and b contact finger a having an extension adapted to be engaged by the cam 46 in a manner to bend it away from contact finger b and open the switch. The cam 46 is sufficiently long to insure the opening of the switch 31 through a small angle of rotation of the cam disk 29, notwithstanding over-travel of the cam disk 29 due to momentum upon interruption of energization of the driving motor 27. As will be explained more fully hereinafter, the cam disk 29 is normally stopped in a position such that the cam 46 engages the contact finger a of the switch 31 and thus maintains the switch 31 in open position. At the same time, the switch 30 may be open or closed, depending upon the exact position of the cam disk 29.

The apparatus comprising the embodiment shown in Fig. 1 may be designed to operate on either direct-current or alternating current voltage, as previously indicated in connection with the description of the relays 25 and 26 and the motor 27. For purposes of description, however, it will be assumed that a source of 110 volts alternating current (A. C.) supply is employed, the two wires from which are connected to the terminal posts 17 and 18 of the terminal strap 15 in the manner shown.

The various connections and circuit wires whereby the parts of the equipment are related will be identified and described in detail hereinafter in connection with an assumed operation.

*Operation of apparatus shown in Fig. 1*

Let it be assumed that the reservoir 12 is suitably charged with air at a pressure of one-hundred twenty pounds per square inch and that the apparatus is otherwise conditioned as shown so that the horn 11 is silent; and that the local operator desires to cause operation of the horn 11 to produce an "alarm" signal. To do so he operates the push-button switch 23 momentarily to closed position.

Closure of the switch 23 establishes a circuit for energizing the winding w of the relay 25. This circuit extends from one terminal of the source of voltage supply at terminal post 17 by way of a wire 51, a branch wire 52, a wire 53, the contacts of the switch 23, a wire 54 including the winding w of the alarm relay 25 to the other terminal of the voltage supply at terminal post 18.

The contacts a and b of the relay 25 are accordingly actuated to their picked-up position. In its picked-up position, the contact b of the relay 25 establishes a circuit for energizing the motor 27. This circuit extends from the terminal post 17 by way of wires 51, 52, and 53, switch 23, wire 54, a branch wire 55 including the closed contact b of the relay 25, a wire 56 including the winding of the motor 27 to the wire 54, and thence to terminal post 18.

The motor 27 is accordingly rotated to cause rotation of the cam disk 29.

When the cam disk 29 has been rotated through a small angle, the contact finger a of the timing switch 31 disengages the cam 46 and engages the face of the cam disk 29, thereby causing closure of the switch 31. The motor 27 is now energized independently of the push-button switch 23 and the relay 25 by a circuit extending from the terminal post 17 by way of the wire 51, contact finger b of the switch 31, contact finger a of the switch 31 to which the wire 56 is connected, and thence by way of the wire 56 and the winding of the motor 27 to the wire 54 which is connected to the terminal post 18.

It will thus be seen that the operator may release the push-button switch 23 and permit it to open, once the timing switch 31 is closed, without causing the motor 27 to stop.

The timing switch 31 is also effective, when closed, to establish a holding circuit for maintaining the winding w of the relay 25 energized, independently of the push-button switch 23. This circuit extends from the terminal post 17 by way of the wire 51, switch 31, wire 56, contact b of the relay 25 in its picked-up position, wire 55, and wire 54 including the winding w of the relay 25 to the terminal post 18.

The contact a of the relay 25, the coding switch 30 and the timing switch 31 are connected in serial relation in a circuit for controlling the magnet winding 41 of the magnet valve device 14. This circuit extends from the terminal post 17 by way of the wire 51, timing switch 31, wire 56, contact a of the relay 25, a wire 58, contact finger a and contact finger b of the coding switch 30, a wire 59 to terminal post 16, thence by way of a continuation of the wire 59, magnet winding 41 of magnet valve device 14, and a further continuation of the wire 59 to the terminal post 18.

It will thus be seen that with the timing switch 31 in closed position and the contact a of the relay in its picked-up or closed position, a circuit for energizing the magnet winding 41 of the magnet valve 14 is established whenever and as long as the coding switch 30 is closed. Thus, the rotation of the cam disk 29 and the consequent alternate closure and opening of coding switch 30, alternately establishes and interrupts the circuit for energizing the magnet winding 41 of the magnet valve device 14 as long as the cam disk 29 continues to rotate.

The horn 11 is accordingly operated to produce alternately an audible blast or signal for an interval of time corresponding to the time that the coding switch 30 is closed and to be silent for a length of time corresponding to the time that the coding switch 30 is open.

As previously indicated, the coding switch 30 is alternately closed and opened for intervals of two seconds, respectively. Thus it will be seen that the horn 11 is alternately sounded and silent for intervals of two seconds as long as the cam disk 29 continues to rotate.

When the cam disk 29 has been rotated substantially through one complete revolution, the time for such complete revolution being assumed to be of the order of two minutes, the cam 46 on the cam disk 29 engages the contact finger $a$ of the timing switch 31 and thereby causes opening of the switch.

The switch 31 is effective when so restored to its open position to interrupt the circuit for energizing the winding of the motor 27 as well as the holding circuit of the winding $w$ of the relay 25. The motor 27 thus coasts promptly to a stop and the contacts of the relay 25 are restored promptly to their dropped-out positions. The momentum of the disk 29 and the driven parts associated therewith is insufficient to cause reclosure of the switch 31 after the circuit for energizing the winding of the motor 27 is interrupted by opening of the switch 31. The motor 27 accordingly remains stopped and the relay 25 remains in its dropped-out position.

With the switch 31 in its open position and the contact $a$ of relay 25 in its dropped-out or open position, the circuit for energizing the magnet winding 41 of the magnet valve device 14 is interrupted and consequently the magnet winding 41 remains deenergized. The supply of air under pressure to the horn 11 is thus interrupted and the horn becomes and remains silent.

It will thus be seen that momentary closure of the switch 23 initiates an operating cycle of predetermined duration for causing operation of the horn 11 to sound the "alarm" signal.

In the absence of a local operator, it may be desirable to initiate an air raid "alarm" signal from a remote control station by means of the relay 33. To do so, the operator at the remote control station momentarily energizes the winding $w$ of the relay 33 in a manner to cause closure of the contact $a$ of the relay. The contact $a$ of the relay 33 is connected in parallel with the push-button switch 23 and is accordingly effective to establish a circuit for energizing the winding $w$ of the alarm relay 25 in substantially the same manner as it is effected in response to the closure of the switch 23. As in the case of the push-button switch 23, it is necessary that the contact $a$ of the relay 33 remain in its picked-up or closed position for a sufficient length of time to permit closure of the timing switch 31 in response to the rotation of the cam disk 29 out of its normal stopped or starting position. Thereafter the winding of the relay 33 may be deenergized and contact $a$ restored to its dropped-out position, the operation containing in exactly the same manner described in connection with operation initiated by the push-button switch 23.

In view of the fact that the operation of the apparatus is the same as that previously described following the operation of the push-button switch 23, it is deemed unnecessary to repeat in detail herein a description of such operation.

Now let it be assumed that the local operator desires to cause operation of the horn 11 to produce the "all-clear" signal. To do so he holds the push-button switch 24 momentarily closed.

In its closed position, the switch 24 establishes a circuit for energizing the winding $w$ of the all-clear relay 26. This circuit extends from the terminal post 17 by way of the wires 51 and 52, a wire 61, switch 24, a wire 62, a wire 63, including the winding $w$ of the relay 26 to the wire 54 and thence to the terminal post 18.

The contacts $a$ and $b$ of the relay 26 are accordingly actuated to their picked-up or closed position.

The contact $a$ of the relay 26 is effective in its closed position to establish initially a circuit for energizing the winding of the motor 27. This circuit extends from the terminal post 17 by way of the wires 51, 52 and 61, switch 24, wire 62, contact $a$ of the relay 26, a wire 65, contact $b$ of the relay 25 in its dropped-out position to the wire 56, thence by way of the wire 56 including the winding of the motor 27 to the wire 54 which is in turn connected to the terminal post 18.

The motor 27 accordingly operates to rotate the cam disk 29 and, after a short angular movement thereof, the timing switch 31 is again closed due to the disengagement of the cam 46 from the contact finger $a$ thereof. The closure of the switch 31 is effective, as in the case of an alarm signal, to establish the circuit previously traced for energizing the winding of the motor 27 to cause it to continue to rotate the cam disk 29 independently of the push-button switch 24 and the contact $a$ of the relay 26.

Closure of the timing switch 31 is also effective to establish a holding circuit for maintaining the winding $w$ of the relay 26 energized independently of the opening of the push-button switch 24. This circuit extends from the terminal post 17 by way of the wire 51, switch 31, wire 56, contact $b$ of the relay 25 in its dropped-out position, wire 65, contact $a$ of the relay 26, wire 62, wire 63 including the winding $w$ of the relay 26, and wire 54 to the terminal post 18. It will accordingly be seen that, once the switch 31 is closed, the relay 26 remains picked-up even though the push-button switch 24 is restored to its open position. Accordingly it is necessary that the operator maintain the switch 24 closed only until the switch 31 is closed, which may be a matter of a few seconds.

The contact $b$ of the relay 26 is effective in its picked-up or closed position to establish a circuit for energizing the winding 41 of the magnet valve device 14. Initially, while the push-button switch 24 is still closed, and prior to the closure of switch 31, the circuit for energizing the magnet winding 41 extends from the terminal post 17 by way of the wires 51, 52, and 61, switch 24, wire 62, contact $a$ of the relay 26, wire 65, contact $b$ of the relay 25 in its dropped-out position, wire 55, contact $b$ of the relay 26, wire 59 including the winding 41 of the magnet valve device 14 to the terminal post 18.

After the push-button switch 24 is released and restored to its open position following the closure of the switch 31, the circuit for energizing the magnet winding 41 of the magnet valve device 14 extends from the terminal post 17 by way of the wire 51, switch 31, wire 56, contact $b$ of the relay 26, wire 59 including the magnet winding 41 of the magnet valve device 14 to the terminal post 18.

It will thus be seen that air is supplied to the horn 11 to initiate a continuous blast or signal thereof the instant the push-button switch 24 is closed, which supply of air is continued thereafter as long as the relay 26 remains picked-up.

After the cam disk 29 has completed one full revolution, the timing switch 31 is again opened thereby interrupting the circuit for energizing the winding of the motor 27 as well as the circuit for the winding $w$ of the relay 26. The motor 27 accordingly coasts promptly to a stop and the contacts of the relay 26 are restored to their dropped-out or open position. With both the switch 31 and the contact $b$ of the relay 26 in open position, the circuit for energizing the magnet winding 41 of the magnet valve device 14 is interrupted and consequently the magnet valve device cuts off the supply of air to the horn 11. Operation of the horn 11 is accordingly terminated and the horn becomes silent.

It will thus be seen that momentary closure of the switch 24 initiates an operating cycle of the apparatus for causing a continuous operation of the horn 11 for a predetermined interval of time to sound the "all-clear" signal.

If the local operator is absent, the "all-clear" signal operation of the horn 11 may be initiated from a remote control station by causing momentary pick-up of the relay 34. The contact $a$ of the relay 34 is connected in parallel with the switch 24 and consequently initiates an operating cycle in the same manner as does the operation of the switch 24. Since the operation of the apparatus is the same in the two instances no further description is believed to be necessary.

The two relays 25 and 26 are interlocked in such a manner that an "alarm" signal may be initiated at any time even during an "all-clear" signal. It will be seen that such is the case because the holding circuit for the relay 26 is maintained over the contact $b$ of the alarm relay 25. Thus if the relay 25 is picked-up, the holding circuit for the relay 26 is interrupted and consequently the contacts of the relay 26 are restored to their dropped-out position. At the same time, the actuation of the contact $b$ of the relay 25 to its picked-up position with the switch 31 closed establishes the holding circuit for the relay 25 in the manner previously described. At the same time the actuation of the contact $a$ of the relay 25 to its picked-up position cuts the coding switch 30 into operation.

It will thus be seen that if it is desired to interrupt an "all-clear" signal to sound an "alarm" signal, this may be done by merely momentarily closing the push-button switch 23 as for initially sounding an "alarm" signal.

It should be understood, however, that this particular feature is not a part of my present invention, being disclosed and claimed in the prior joint application, Serial No. 441,196 of Robert A. Mitchell and the present applicant.

Now let it be assumed that during an operating cycle of eilther an "alarm" or an "all-clear" signal the power supply connected to the terminal posts 17 and 18 fails for some reason. In such case, the relay 25 or the relay 26 depending upon the type of signal in effect is restored to its dropped-out position because of the failure of the power supply. At the same time, the motor 27 comes to a stop.

It will be observed, however, that the timing switch 31 remains closed because of the fact that the cam 46 has not been returned to its normal stopped or starting position.

Accordingly, upon the resumption of the power supply the circuit for energizing the winding of the motor 27 which extends from the terminal post 17 by way of the wire 51, switch 31, wire 56 including the winding of the motor 27, and wire 54 to the terminal post 18 is immediately effective to cause the motor 27 to rotate the disk 29 to its original starting position. In this position of disk 29 the cam 46 engages the contact finger $a$ of the switch 31, thereby restoring the switch to its open position which in turn causes the motor to stop automatically.

It will be apparent, that the restoration of the cam disk 29 to its normal starting position in the manner just described does not cause operation of the horn 11 because of the fact that the relay 25 (or 26) has been restored to its dropped-out position. Thus, in the case of interruption of the power supply during an "alarm" signal, the restoration of the contact $a$ of the relay 25 to its dropped-out position interrupts the circuit whereby the coding switch 30 controls the energization of the magnet winding 41 of the magnet valve device 14 and consequently the alternate closing and opening of the switch 30 in response to rotation of the cam disk 29 to its normal starting position is without effect.

In the case of an interruption of an "all-clear" signal due to power failure, the restoration of the contact $b$ of the relay 26 to its open position is effective similarly to prevent the energization of the magnet winding of the magnet valve device 14.

This feature whereby the cam disk 29 is automatically restored to its normal starting position upon the restoration of power supply following a failure thereof is a particular feature of my present invention as indicated in the appended claims defining such feature. Obviously, the automatic restoration of the cam disk 29 to its normal starting position insures a full duration of an operating cycle upon subsequent initiation of either an "alarm" or an "all-clear" signal by operation of the switches 23 and 24 or by operation of the relays 33 and 34.

*Figure 3*

The embodiment of my invention shown in Fig. 3 differs from that shown in Fig. 1 essentially in providing additional mechanism whereby the duration of an "all-clear" signal is automatically limited to a time which is less than the duration of an "alarm" signal.

For the most part, the apparatus in Fig. 3 is identical to that in Fig. 1 and accordingly such apparatus is identified by the same reference numerals as in Fig. 1 without further description. Accordingly only so much of the apparatus shown in Fig. 3 as differs from that in Fig. 1 will be specifically described. In order to cause the duration of an "all-clear" signal to be limited to a time less than the duration of the "alarm" signal, a speed-change mechanism 75 is interposed between the output shaft 40 of the speed-reducing gear mechanism 28 and a shaft 40a to which the cam disk 29 is fixed.

The speed change mechanism 75 comprises an overrunning clutch device having cooperating clutch members 76 and 77 provided with cooperating serrated clutch faces. The clutch member 76 is fixed on the output shaft 40 of the speed-reducing gear mechanism 28 and the clutch member 77 is mounted on the shaft 40a for rotary and axially slidable movement on the shaft.

The clutch member 76 includes a friction cone clutch element 78 which cooperates with a similar friction cone clutch element 79 fixed on an auxiliary shaft 81 slidably supported in parallel relation to the shaft 40a. Fixed on the auxiliary shaft 81 is a gear wheel, such as a spur gear 82 which meshes with a similar gear wheel 82 fixed on the shaft 40a.

A helical spring 85 surrounds the shaft 40a in concentric relation between the clutch member 77 and the gear 83 and has its opposite ends fixed in the clutch member 77 and the gear 83.

The auxiliary shaft 81 has a collar 86 fixed thereon, and a coil spring 87 interposed between the collar 86 and a stationary bracket or support 88 yieldingly urges the shaft 81 normally to a position in which the cone clutch element 79 is disengaged from the cone clutch element 78.

A solenoid 89 having a winding 91 and a plunger 92 that is actuated in response to energization of the winding is effective to exert a force in opposition to the spring 87 to cause axial movement of the shaft 81 to cause engagement of the cone clutch element 79 with the cone clutch element 78. The plunger 92 may exert a force directly on the lower end of the shaft 81 or a pivoted lever 93 may be provided, as shown, between the plunger 92 and the shaft 81 through which the force exerted by the plunger is transmitted to the shaft 81.

The degree of relative axial movement between the shaft 81 and the shaft 40a is such that the gears 82 and 83 remain constantly in mesh relation.

In operation, with the winding 91 of the solenoid device 89 deenergized and the friction cone clutch element 79 correspondingly disengaged from the friction cone clutch element 78, rotation of the output shaft 40 of the speed-reduction gear mechanism 28 causes the shaft 40a to be driven directly through the serrated clutch members 76 and 77 and the helical spring 85 at the same speed as the shaft 40.

Upon energization of the winding 91 of the solenoid device 89 and the consequent engagement of the friction cone clutch element 79 with the friction cone clutch element 78, the shaft 40a is driven through the friction cone clutch elements 78 and 79 and the gears 82 and 83 at a speed depending upon the ratio of the diameters of the friction cone clutch elements.

As shown, the friction cone clutch element 79 has a diameter which is one-half of the diameter of the friction cone clutch element 78. Thus with the cone clutch elements 78 and 79 engaged, the shaft 40a in the cam disk 29 is driven at a speed which is twice that of the output shaft 40 of the speed-reducing gear mechanism 28. In such case, the serrated clutch member 77 overruns the associated serrated clutch member 76, due to the direction of slope of the serrated clutch surfaces on the members 76 and 77, axial movement of the clutch member 77 in the direction of the gear 83 being yieldingly resisted by the spring 85.

The apparatus shown in Fig. 3 differs further from that shown in Fig. 1 in providing an all-clear relay 26a which differs from the all-clear relay 26 in having an additional front contact c which is effective in its picked-up or closed position to establish a circuit for energizing the magnet winding 91 of the solenoid device 89. This circuit extends from the terminal post 17 of the source of supply by way of the wire 51, a branch wire 94 including the magnet winding 91 of the solenoid device 89, contact c of the relay 26a, a wire 95, and wire 54 to the terminal post 18 of the source of supply.

It will accordingly be seen that the winding 91 of the solenoid device 89 will be energized whenever and as long as the all-clear relay 26a is picked-up. Consequently, upon initiation of an "all-clear" signal, the cam disk 29 will be rotated automatically at a speed which is twice its speed of rotation during the "alarm" signal initiated in response to the pick-up of the alarm relay 25.

On the basis that the cam disk 29 rotates through one complete revolution in two minutes during an "alarm" signal, it will thus be apparent that during the "all-clear" signal, the cam disk 29 rotates through one complete revolution in one minute. The duration of the "all-clear" signal is accordingly automatically limited to one minute whereas the duration of the "alarm" signal is the same as in the apparatus of Fig. 1, namely, two minutes.

Obviously, when the cam 46 on the cam disk 29 opens the timing switch 31 to cause interruption of the holding circuit described in connection with Fig. 1 for the all-clear relay 26a, the contacts of the relay 26a are restored to their dropped-out position. The restoration of the contact c of the relay 26a to its dropped-out or open position accordingly causes deenergization of the winding 91 of the solenoid 89 and the consequent disengagement of the cone clutch element 79 from the cone clutch element 78.

In view of the fact that the apparatus in Fig. 3 operates in the same manner as the apparatus in Fig. 1, except as just described, it is believed unnecessary to repeat a description of such operation in connection with Fig. 3.

Having now described my invention, what I claim as new and desire to secure by Letters Patent, is:

1. In a control system for a signal device, the combination of a rotary cam member, electric motive means effective when energized to rotate said rotary cam member, an alarm relay, an all-clear relay, two selectively operable switches one of which is effective to cause pick-up of the alarm relay and the other of which is effective to cause pick-up of the all-clear relay, circuit connections severally controlled by said relays for causing energization of said electric motive means in response to pick-up of either of said relays to initiate rotation of said rotary cam member, a timing switch normally in open position and operative to a closed position in response to the rotary movement of the rotary cam member out of a given starting position to cause energization of said electric motive means independently of either of said relays and effective to establish respective holding circuits for said relays for maintaining said relays picked-up independently of the manually operative switches, electroresponsive means effective when energized to cause operation of said signal device and when deenergized to terminate operation of the signal device, a coding switch associated with said rotary cam member and operative alternately to closed and open positions in response to continued rotation of the rotary cam member, said alarm relay being effective when picked-up to establish a circuit including the said coding switch and the electroresponsive means whereby said electroresponsive means is alternately energized and deenergized in correspondence with the alternate closing and opening of the coding switch, said all-clear relay being effective while picked-up to maintain said electroresponsive means continuously energized, said timing switch being effective upon restoration to its open position in response to a predetermined degree of rotative movement of the rotary cam member to effect deenergization of said electric motive means and the restoration of either of said relays depending upon which is picked-up, to its dropped-out position whereby to cause deenergization of said electroresponsive means and termination of the operation of said signal device.

2. In a control system for a signal device, the combination of a rotary signal control member, electric motive means effective when energized to rotate said rotary control member at a substantially constant speed, two selectively operable switch devices, means set in operation in response to momentary operation of one of said switch devices for causing said electric motive means to rotate said rotary control member through a certain angle of rotation and then stop it, means set in operation in response to momentary operation of the other of said selectively operable switch devices to cause said electric motive means to rotate said rotary control member through said certain angle of rotation and then stop it, means rendered effective in response to momentary operation of said one switch device whereby rotation of said rotary control member causes a given coded operation of said signal device, means rendered effective in response to the momentary operation of the other of said selectively operable switch devices for causing a continuous operation of said signal device, and means associated with said rotary control member effective in response to the restoration of the power supply for said electric motive means following a failure thereof during either a coded or a continuous operation of said signal device for causing restoration of said rotary control member to its predetermined starting position without further operation of either of said selectively operable switch devices.

3. In a control system for a signal device, the combination of a coding and timing mechanism effective upon operation to cause operation of said signal device for any one of a plurality of different lengths of time, a pair of selectively operable control devices, means responsive to any momentary operation of one of said control devices for causing operation of said coding and timing mechanism to effect a given operation of the signal device for a certain uniform length of time, and means responsive to any momentary operation of the other of said control devices for causing said coding and timing mechanism to operate to cause a different operation of said signal device for a certain different uniform length of time.

4. In a control system for a signal device, the combination of two selectively operable control devices, a rotary control element, motive means for rotating said rotary control element, means responsive to operation of either of said control devices for causing continued operation of said motive means, means associated with said rotary control element for effecting operation of said signal device for a length of time determined by the length of time required for the rotary control element to rotate through a predetermined angle, a drive mechanism interposed between the motive means and the said rotary control element effective at one time to cause rotation of said rotary control member at one certain uniform speed in response to a given speed of operation of said motivet means and effective at another time to cause rotation of said rotary control member at a certain different uniform speed in response to said given speed of operation of the motive means, and means responsive to any operation of one of said control devices for controlling said drive mechanism in a manner to cause rotation of the rotary control element at said certain uniform speed and responsive to any operation of the other of said control devices for controlling said drive mechanism in a manner to cause rotation of the rotary control element at said certain different uniform speed.

5. In a control system for a signal device, the combination of two selectively operable control devices, a rotary signal control member, means associated with said rotary signal control member for controlling the duration of a cycle of operation of said signal device in accordance with the speed of rotation of the rotary control member, and means responsive to any operation of one of said control devices for causing rotation of said rotary signal control member at one certain uniform speed and responsive to any operation of the other of said control devices for causing rotation of the rotary signal control member at a certain different uniform speed.

6. In a control system for a signal device, the combination of two selectively operable control devices, means operative in response to the operation of one of said control devices for causing one certain continued operation of said signal device, means operative in response to the operation of the other of said control devices for causing a different continued operation of said signal device, and a common timing means set in operation in response to any operation of either of said control devices and effective, depending upon which of said control devices is operated, to limit the duration of the operating cycle of the signal device selectively to one certain uniform length of time or a certain different uniform length of time.

7. In a control system for a signal device, the combination of two selectively operable control devices, means operative in response to operation of one of said control devices for causing one certain continued operation of said signal device, means operative in response to operation of the other of said control devices for causing a different continued operation of said signal device, timing means including a rotary member, motive means for rotating said rotary member, means responsive to operation of either of said control devices for causing said motive means to drive said rotary member, means responsive to a predetermined rotation of said rotary member for terminating the operation of the signal device and also to cause said motive means to stop driving said rotary member, speed-change mechanism through which the motive means drives the rotary member, and means for controlling said speed-change mechanism in a manner to cause said rotary member to be driven at one certain uniform speed in response to any operation of one of said control devices and at a certain different uniform speed in response to any operation of the other of said control devices.

8. In a control system for a signal device, the combination of two selectively operable signal control devices, signal coding means including a rotary member, motive means for rotating said rotary member, a speed-change mechanism through which the motive means drives the rotary member, said mechanism being normally conditioned to cause the rotary member to rotate at one certain uniform speed for a given speed of said motive means, and effective upon a change in the condition thereof to cause the rotary member to rotate at a certain different uniform speed for said given speed of the motive means, means responsive to the operation of one of said control devices for causing operation of said motive means while said speed-change mechanism is normally conditioned, and means operative in response to the other of said control devices for causing operation of said motive means and a change in the condition of said speed-change mechanism.

9. In a control system for a signal device, the combination of two selectively operable signal control devices, signal coding means including a rotary member, motive means for rotating said rotary member, a speed-change mechanism through which the motive means drives the rotary member, said mechanism being normally conditioned to cause the rotary member to rotate at one certain uniform speed for a given speed of said motive means, and effective upon a change in the condition thereof to cause the rotary member to rotate at a certain different uniform speed for said given speed of the motive means, means responsive to the operation of one of said control devices for causing operation of said motive means while said speed-change mechanism is normally conditioned, means operative in response to the other of said control devices for causing operation of said motive means and a change in the condition of said speed-change mechanism, and means responsive to rotation of the rotary member through a predetermined angle for terminating operation of the motive means and causing restoration of the speed-change mechanism to its normal condition if changed therefrom.

10. In a control system for a signal device, the combination of a rotary cam member, electric motive means for rotating said cam member, a coding switch associated with said rotary cam member and operative alternately to open and closed positions in response to rotation of said rotary cam member, an electrical relay having a winding, a control switch normally in open position and effective upon operation to closed position to cause energization of the winding of said relay and the consequent pick-up thereof, a timing switch associated with said rotary cam member, means on said rotary cam member cooperating with said timing switch for causing said timing switch to be in open position only when the rotary cam member is stopped in a certain rotative position, electro-responsive means controlled jointly by said coding switch and said relay for effecting operation of the signal device only while the coding switch is closed and said relay is picked-up, said relay being effective when picked-up to cause energization of said electric motive means to initiate rotation of said cam member, said timing switch being effective when closed to cause energization of said electric motive means independently of said relay and also to establish a holding circuit for the winding of said relay whereby said relay is maintained picked-up notwithstanding the restoration of the said control switch to its open position, said timing switch being effective when restored to its open position after one revolution of the rotary cam member to interrupt the holding circuit of said relay and deenergize said electric motive means and also effective in response to restoration of the power supply for said electric motive means following a failure thereof during an operating cycle of said signal device for causing energization of the electric motive means to restore said rotary cam member to its starting position independently of said relay, said relay at the same time being in its dropped-out position, preventing energization of the electroresponsive means notwithstanding rotation of the rotary cam member and operation of said coding switch.

CLAUDE M. HINES.